(12) United States Patent
Rusanen et al.

(10) Patent No.: US 12,453,316 B2
(45) Date of Patent: Oct. 28, 2025

(54) PRUNER

(71) Applicant: Fiskars Finland Oy Ab, Espoo (FI)

(72) Inventors: Niko Rusanen, Espoo (FI); Mikko Heine, Espoo (FI); Erkki Seppäläinen, Kauniainen (FI); Thomas Nyholm, Helsinki (FI)

(73) Assignee: Fiskars Finland Oy Ab, Espoo (FI)

( * ) Notice: Subject to any disclaimer, the term of this patent is extended or adjusted under 35 U.S.C. 154(b) by 82 days.

(21) Appl. No.: 18/336,794

(22) Filed: Jun. 16, 2023

(65) Prior Publication Data

US 2024/0415066 A1 Dec. 19, 2024

(51) Int. Cl.
*A01G 3/08* (2006.01)

(52) U.S. Cl.
CPC .................. *A01G 3/085* (2013.01)

(58) Field of Classification Search
CPC .......... B26B 15/00; A01G 3/037; A01G 3/08; A01G 3/0475; A01G 3/053; A01G 3/0535; A01G 3/062; A01G 3/067; A01G 3/085
USPC ...... 30/228, 216, 210, 247, 249, 245, 296.1; 254/424, 425; 81/57, 42, 301; 72/454, 72/21.3
See application file for complete search history.

(56) References Cited

U.S. PATENT DOCUMENTS

| 8,689,599 B2 * | 4/2014 | Green | B25B 27/146 |
| | | | 29/283 |
| 2010/0064527 A1 * | 3/2010 | Lee | A01G 3/037 |
| | | | 30/228 |
| 2012/0011729 A1 * | 1/2012 | Kim | A01G 3/037 |
| | | | 30/228 |
| 2023/0137643 A1 * | 5/2023 | Gautier | A01G 3/037 |
| | | | 30/249 |

FOREIGN PATENT DOCUMENTS

| AU | 2009324027 A1 * | 6/2011 | ............. A01G 3/04 |
| EP | 4 000 381 | 5/2022 | |
| EP | 3 876 696 | 1/2023 | |
| EP | 3606329 B1 * | 7/2024 | ........... A01G 3/0335 |
| FR | 2939008 A1 * | 6/2010 | ............. A01G 3/04 |

OTHER PUBLICATIONS

Oct. 27, 2023 Search Report issued in Finnish Patent Application No. 20235757, pp. 1-2.

* cited by examiner

*Primary Examiner* — Ghassem Alie
(74) *Attorney, Agent, or Firm* — Nixon & Vanderhye PC

(57) ABSTRACT

A pruner includes a pruner body, a cutting system, an electric motor to provide driving power for the cutting system. Rotation of the electric motor in a first direction is provides a cutting action. A control system is provided for controlling the electric motor. The pruner further includes a blade stuck detection system to detect a blade stuck situation in which the cutting system is not able to reach the closed position, and the control system, as a response to detection of the (Continued)

blade stuck situation, is configured in a recut operation to rotate the electric motor in a second direction opposite the first direction, and then to rotate the electric motor in the first direction to actuate the cutting system towards the closed position.

14 Claims, 2 Drawing Sheets

PRUNER

FIELD OF THE INVENTION

The present invention relates to a pruner according to the preamble of claim 1.

BACKGROUND OF THE INVENTION

Electric pruners are used to prune branches of trees without needing to power the cutting motion with manual force. A known electric pruner comprises an electric motor connected to a pruner body, and a transmission system adapted to transfer power from the electric motor to a cutting system.

A common disadvantage associated with the above-mentioned pruners is that the electrically operated pruners have troubles with cutting thick and hard branches in one cutting motion, even though the branch is able to fit between the blades of the cutting system in open position. This may be due to properties of the branch i.e. oak is hard, and dry wood is harder than fresh wood. Alternatively, the issues may be due to reaching a max current limit, or in case ambient temperature is low the battery max supply current and voltage may be limited, or the battery may have depleted, and the max current has decreased due to depletion of the battery.

If the pruner is not able to cut the branch, the user may reinitiate the cutting operation manually to continue cutting the branch. However, this can be very tedious as cutting the branch may take up to 10 repetitions of the cutting motion and there may be multiple difficult to cut branches. Cutting of the branch must in most cases be completed, as the cutting system may be wedged in the partially cut branch, and if the cutting system is stuck on a high branch the user is not easily able to detach the cutting system of the pruner from the branch and therefore is not able to get the pruner down.

Therefore, there exists a clear need for an improved pruner.

BRIEF DESCRIPTION OF THE INVENTION

An object of the present invention is to provide a pruner so as to alleviate the above disadvantages. The objects of the invention are achieved by a pruner which is characterized by what is stated in the independent claim. The preferred embodiments of the invention are disclosed in the dependent claims.

The invention is based on the idea of providing the pruner with a blade stuck detection system adapted to detect a blade stuck situation in which the cutting system is not able to reach a closed position, and a control system adapted to rotate the electric motor in a second direction opposite the first direction as a response to detection of the blade stuck situation, and then to rotate the electric motor in the first direction towards the closed position. This way, the pruner is adapted to automatically resolve a blade stuck situation, in which the pruner is not able to cut the branch in one cutting motion, and thereby the pruner is able to continue cutting the branch.

It has been noted in praxis that by performing repetitive cuts with a pruner, a thick branch can be cut in multiple steps. Therefore, an advantage of the pruner of the invention is that it allows the cutting capacity of the pruner to be increased, thereby improving the performance of the pruner.

Further, the pruner of the invention relieves the user from having to repeat initiating the cutting motion manually, thereby improving user satisfaction.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
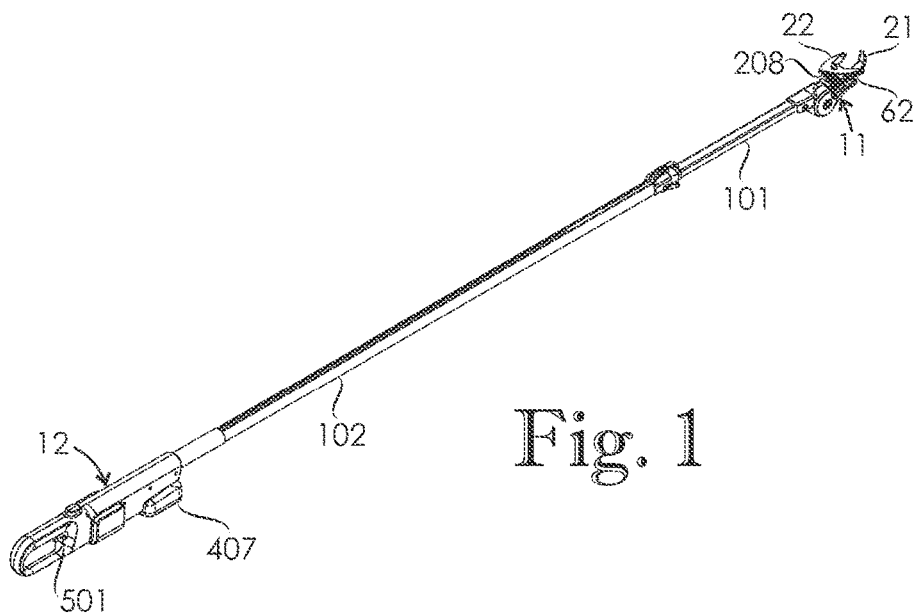
FIG. 1 shows a pruner according to an embodiment of the invention.

FIG. 1 shows a pruner comprising a pruner body and a cutting system. The pruner body comprising a first body section 11 and a second body section 12 attached to each other. The cutting system is connected to the first body section 11, and the cutting system comprises a first cut element 21 and a second cut element 22 pivotably attached to each other for cutting branches, wherein the first cut element 21 and the second cut element 22 are adapted to move relative to each other such that the cutting system has an open position and a closed position. In FIG. 1, the cutting system is in the open position.

The pruner further comprises an electric motor 4 connected to the second body section 12 and adapted to provide driving power for the cutting system. When the electric motor 4 rotates in a first direction, the cutting system is actuated towards the closed position.

In the embodiment of FIG. 1, the pruner comprises a transmission rope 6, wherein a first end of the transmission rope 6 is connected to the cutting system, and a second end of the transmission rope 6 is connected to the electric motor 4 such that rotation of the electric motor 4 in a first direction pulls the first end of the transmission rope 6 towards the second body section 12. Rotation of the electric motor 4 in a first direction is adapted to provide a cutting action in which the cutting system moves from the open position towards the closed position. In this connection the pruner further comprises at least one return spring 208 adapted for returning the cutting system to the open position when the electric motor is rotated in the second direction opposite the first direction.

The pruner also comprises a control system 5 for controlling the electric motor 4. Preferably, a battery 407 is adapted to provide power to the electric motor 4.

The pruner further comprises a blade stuck detection system adapted to detect a blade stuck situation in which the cutting system is not able to reach the closed position. This situation may occur when the branch being cut is so hard that the pruner is not able to complete the cutting action. In the blade stuck situation, the cutting system is not able to move towards the closed position, prevented by the branch, and the cutting system may also not be able to move back towards the open position if the cut elements 21, 21 are wedged in the branch.

In the blade stuck situation, the control system 5, as a response to detection of the blade stuck situation, is adapted in a recut operation to rotate the electric motor 4 in a second direction opposite the first direction, and then to rotate the electric motor 4 in the first direction to actuate the cutting system towards the closed position. There are many benefits gained from rotating the electric motor 4 first in the second direction and then in the first direction again. Firstly, this provides a momentary load reduction of the battery 407 chemistry that allows the battery 407 to deliver higher peak current when the motor 4 is driven in the first direction again, thus resulting in increased cutting ability of the cutting system. Secondly, the motor rotation in the first direction is able to build up inertial energy that will add to cutting system cutting power compared to the blade stuck situation. Both of these aspects have a synergic effect of increasing the cutting power of the pruner.

Figure 3A:
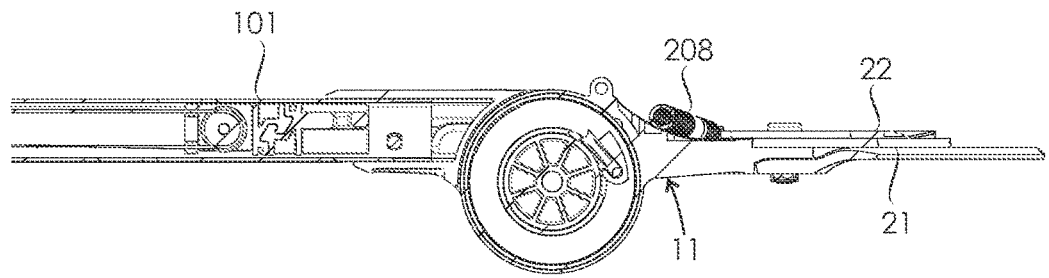
FIG. 3A shows a cross section of a first end of the pruner of FIG. 1 as seen from right side.
Figure 3B:
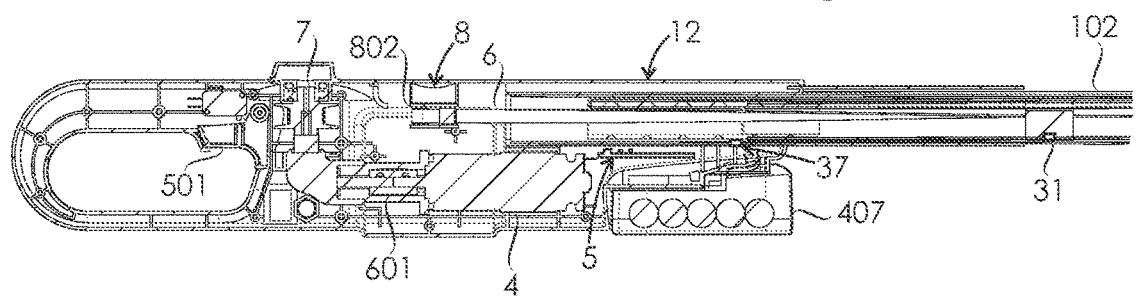
FIG. 3B shows a cross section of a second end of the pruner of FIG. 1 as seen from right side.
Figure 4A:
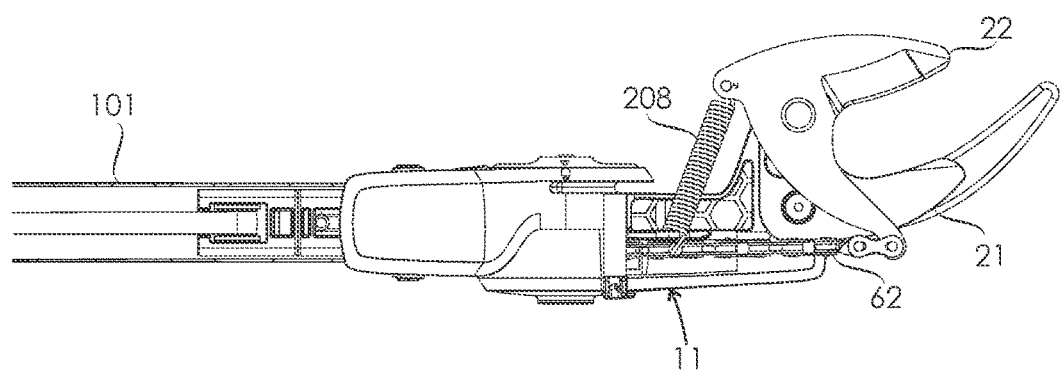
FIG. 4A shows a cross section of the first end of the pruner of FIG. 1 as seen from above.
Figure 4B:
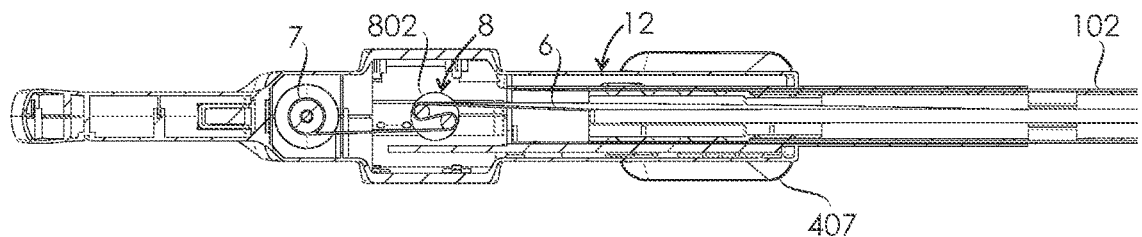
FIG. 4B shows a cross section of the second end of the pruner of FIG. 1 as seen from above.

FIGS. 3A to 4B show cross sections of end portions of the pruner of FIG. 1. FIG. 3A shows a cross section of a first end as seen from right side. FIG. 3B shows a cross section of a second end as seen from right side. FIG. 4A shows a cross section of the first end as seen from above. FIG. 4B shows a cross section of the second end as seen from above.

In the embodiment of FIG. 1, as illustrated in FIG. 3B, the control system 5 comprises a manual operating switch 501, and the control system 5 is adapted to repeat the recut operation until the user of the pruner releases grip from the operating switch 501 or the cutting system reaches the closed end position. This allows the difficult to cut branch to be automatically taken through multiple cutting actions, which in praxis has been found to facilitate cutting of the branch. By repeating this recut operation automatically, the user is relieved from having to manually restart the cutting. Also, by repeating the cutting motion initiated by the control system 5, the recut operation can be optimized for better cutting performance of the pruner as opposed to performing the recutting manually.

Preferably, the control system 5 is adapted to perform the recut operation if the user keeps holding the operating switch 501 for a predetermined time. This allows the user to manually initiate the recut operation at will even if the blade stuck detection system is not able to detect that the branch has not been cut or if the blade is stuck in other scenarios, thus facilitating user satisfaction.

Preferably, the control system 5 is adapted to control the electric motor 4 to rotate in the second direction as a response to a situation in which a user of the pruner releases grip from the operating switch 501. This is an important safety feature which ensures that the electric motor 4 does not actuate the cutting system further towards closed position if the operating switch 501 is released. This way the user of the pruner may at will also perform the recut operation in manual steps by engaging the operating switch and releasing the operating switch in turns if the need arises.

In the embodiment of FIG. 1, the control system 5 is adapted in the recut operation to rotate the electric motor 4 in the second direction for at least 0.05 seconds as a response to detection of the blade stuck response. This timing ensures that the battery load is reduced sufficiently, and that the benefits of the recut operation are achieved. Shorter times may also be used, however using shorter times may yield worse performance of the recut operation. Unnecessary lengthening of the time rotating the electric motor 4 in the second direction also decreases performance of the recut operation, as it slows down the operation without providing significant advantages. Therefore, preferably the electric motor 4 is rotated in the second direction from 0.05 seconds to 0.5 seconds. This results in faster and more efficient iterations of the cutting motion than what could be performed by manually engaging and disengaging the operating switch 501.

In the embodiment of FIG. 1, the control system 5 is adapted in the recut operation to rotate the electric motor 4 in the first direction at a rotation speed of more than 20% of a nominal rotation speed at the moment the cutting system hits the branch again in the recut operation. This dimensioning allows a great enough difference in cutting power to sufficiently facilitate cutting of the branch in multiple cuts. By increasing the duration of the electric motor 4 rotating in the second direction in the recut operation, also the rotation speed in first direction at the moment the cutting system hits the branch again can be increased.

Preferably, the ways to implement the blade stuck detection system described in the following can be used alone or in combination.

One way to implement the blade stuck detection system is to utilize a revolution counter connected to the electric motor 4. The number of revolutions of the electric motor 4 required for the cutting system to reach the closed position can be calculated and set, and the number of revolutions recorded by the revolution counter can be compared to the set number in order to determine if the cutting system has reached the closed position. If the predetermined number of revolutions is not reached, the blade stuck system is able to determine that the pruner was not able to cut the branch, and thus detect the blade stuck situation.

Another way to implement the blade stuck detection system is to track the current of the electric motor 4, and to set a predetermined maximum current limit for the electric motor 4. If the electric motor 4 reaches the predetermined maximum current, the blade stuck detection system can determine that the pruner was not able to cut the branch, and it can detect the blade stuck situation.

Yet another way to implement the blade stuck detection system is to utilize a slack rope detection system, and the blade stuck detection system is able to detect a blade stuck situation based detecting a slack rope situation. The slack rope situation may be caused by a situation in which the cutting system is stuck such that the return spring 208 is not capable of returning the cutting system to the open position even when there is no tension in the transmission rope 6. In the following, one way to implement the slack rope detection system is described. Alternatively, also other known ways to implement the slack rope detection system can be utilized.

A slack rope detection system can be implemented with a tension management system 8, for instance. The tension management system is communicatively connected to the control system 5 and is adapted to detect a slack rope situation in which tension of the transmission rope 6 is below a predetermined limit value. In the embodiment of FIG. 1, as illustrated in FIG. 4B, the tension management system 8 comprises a spring-loaded rope tensioner 802. The tension management system 8 is adapted to detect the slack rope situation based on a position of the spring-loaded rope tensioner 802. The spring-loaded tensioner may comprise a known tensioner.

Yet another way to implement the blade stuck detection system is to utilize a position detection system for detecting the position of the first cut element 21 and/or the second cut element 22, and the blade stuck detection system is able to detect a blade stuck situation based on the position detection system. In the following, one way to implement the position detection system is described. Alternatively, also other known ways to implement the position detection system can be utilized.

In the embodiment of FIG. 1, as illustrated in FIG. 3B, the position detection system comprises a first locating mark element 31 connected to the transmission rope 6, and a position sensor 37 connected to the second body section 12 such that the first locating mark element 31 and the position sensor 37 are adapted to co-operate for detecting the closed position.

In the alternative embodiment in which the position detection system is adapted to detect a plurality of positions of the cutting system, the position detection system comprises a plurality of locating mark elements connected to the transmission rope such that the plurality of locating mark elements and the position sensor are adapted to co-operate for detecting the plurality of positions of the cutting system. The locating mark elements are spaced apart from each other along a length of the transmission rope 6.

The plurality of locating mark elements comprises the first locating mark element and a second locating mark element. In an alternative embodiment, the position detection system comprises one locating mark element for each of the plurality of positions of the cutting system detectable by the position detection system.

The first locating mark element 31 and the position sensor 37 are adapted to co-operate for detecting the closed position. The second locating mark element and the position sensor are adapted to co-operate for detecting the open position. Therefore, the position detection system is able to detect both the open and the closed position of the cutting system.

Preferably, the first locating mark element 31 comprises a magnet, and the position sensor 37 comprises a Hall sensor.

In the alternative embodiment in which the position detection system is adapted to detect a plurality of positions of the blade system, each of the plurality of locating mark elements comprises a magnet, and the position sensor comprises a Hall sensor. The position sensor comprises exactly one Hall sensor element, and the magnets of the first locating mark element and second locating mark element are adapted to provide different type of magnetic fields such that the exactly one Hall sensor element is capable of distinguishing the first locating mark element from the second locating mark element. In an embodiment, orientations and/or magnitudes of the magnetic fields of magnets of the first locating mark element and second locating mark element are different from each other.

In an alternative embodiment, the position sensor comprises one Hall sensor element for each of the plurality of locating mark elements. The Hall sensor elements may be spaced apart in the longitudinal direction of the pruner body.

Cutting of a tree branch with the pruner according to the invention is performed by positioning the cutting system on a branch, such that the branch is located between the cut elements 21, 22. Then the user initiates the cutting motion with use of the control system 5 causing the cutting system to move from the open position towards the closed position. If the cutting system is able to reach the closed position completely, the control system 5 controls the electric motor 4 to rotate in the second direction to allow the cutting system to open towards the open position. If the cutting system is not able to reach the closed position completely, the control system 5 initiates the recut operation to repeat the cutting motion until the cutting system reaches the closed position completely and the branch is cut. Preferably, for safety reasons, the user is able to abort the cutting by releasing the operating switch 501.

In the embodiment of FIG. 1, the pruner comprises a transmission system adapted to transfer power from the electric motor 4 to the cutting system. The transmission system comprises a reduction gear 601, a rope reel 7, a transmission rope 6 and a transmission chain 62. However, also alternative ways of providing a transmission system comprising a transmission rope 6 can be used. In an alternative embodiment not illustrated, the transmission system comprising the reduction gear 601 and the rope reel 7 is built in the electric motor 4

In the embodiment of FIG. 1, a first end of the transmission rope 6 is connected to the cutting system through the transmission chain 62, and a second end of the transmission rope 6 is connected to the electric motor 4 such that rotation of the electric motor 4 in the first direction is adapted to pull the first end of the transmission rope 6 towards the second body section 12 in the longitudinal direction. In an alternative embodiment not illustrated, a first end of the transmission rope is directly connected to the cutting system.

In the embodiment of FIG. 1, the rope reel 7 is adapted to receive a portion of the transmission rope 6 around it, and the electric motor 4 is adapted to rotate the rope reel 7. Herein, expression "transmission rope" is intended to cover all flexible elongated structures which can be wound on a rope reel, and which are capable of transferring power from the electric motor to the cutting system. Therefore, expression "transmission rope" covers a string and a belt, for example.

In the embodiment of FIG. 1, the length of the operation movement is 350 mm. In an alternative embodiment, a length of the operation movement is in a range of 100-500 mm. In an alternative embodiment, a length of the operation movement is in a range of 10-300 mm.

Preferably, the transmission rope 6 comprises aramid material, and comprises a woven part. A cross section of the transmission rope 6 is rectangular such that a width of the transmission rope 6 is greater than a thickness thereof. In an embodiment, a width of the transmission rope is greater than or equal to 300% of a thickness of the transmission rope. In an alternative embodiment, a cross section of the transmission rope is circular.

In the embodiment of FIG. 1, the first cut element 21 is stationarily connected relative to the first body section 11, and the second cut element 22 is pivotally attached in relation to the first body section 11. The first cut element 21 and second cut element 22 are adapted to co-operate as bypass blades for cutting branches. In an alternative embodiment not illustrated, the first cut element and second cut element are adapted to co-operate as anvil blades for cutting branches.

In the embodiment of FIG. 1, the first body section 11 is adapted to be rotated relative to the second body section 12 around a rotation axis perpendicular to the longitudinal direction of the pruner body. In FIG. 3A said rotation axis is perpendicular to the image plane, and in FIG. 4A said rotation axis is vertical.

Preferably, the pruner is a tree pruner, and the first body section 11 and the second body section 12 are spaced apart in a longitudinal direction of the pruner body.

Figure 2:
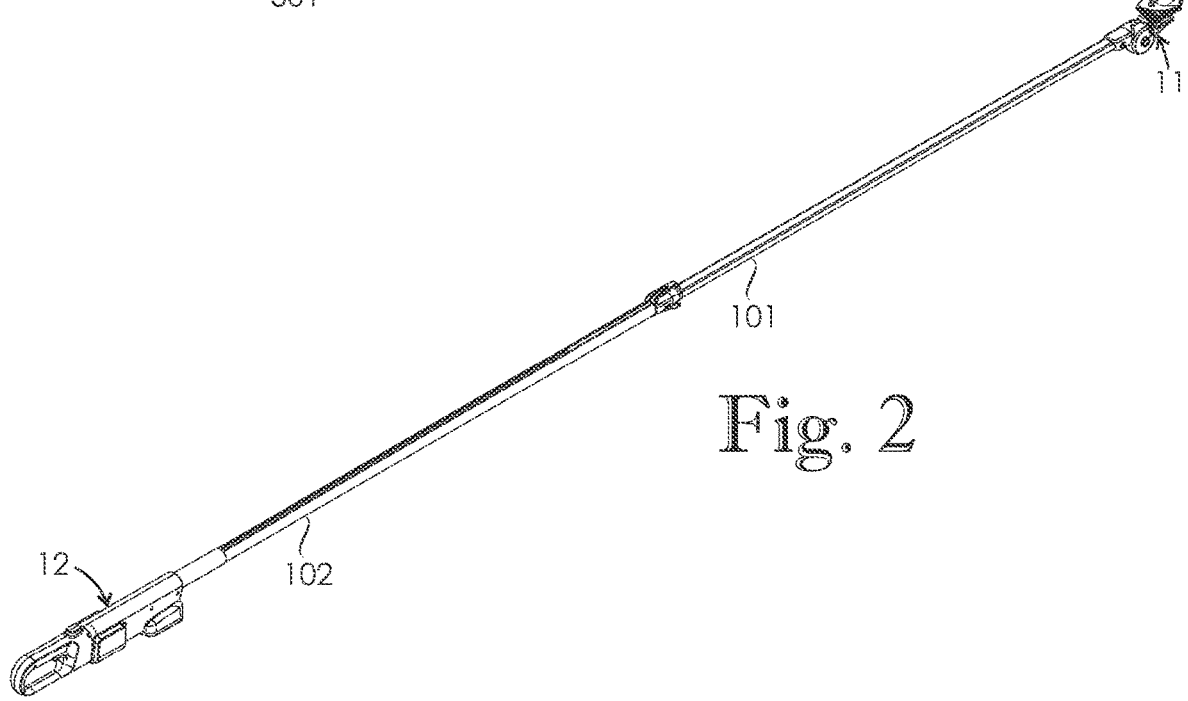
FIG. 2 shows the pruner of FIG. 1 in another operating position in which a telescopic structure of the pruner is in an extended state.

In the embodiment of FIG. 1, the pruner body has a telescopic structure such that a distance between the first body section 11 and the second body section 12 is adjustable. FIG. 2 shows the pruner of FIG. 1 in another operating position in which the telescopic structure of the tree pruner is in an extended state compared to the one shown in FIG. 1.

In the embodiment of FIG. 1, the pruner body comprises a first tube 101 and a second tube 102 such that the first tube 101 extends partially inside the second tube 102 in order to provide the telescopic structure of the pruner body. In this instance, the transmission rope 6 extends inside the first tube 101 and the second tube 102.

In an alternate embodiment of the pruner, the control system 5 as a response to detection of the blade stuck situation, is adapted in a recut operation to turn off the electric motor 4, and then to turn on the electric motor 4 and rotate the electric motor 4 in the first direction to actuate the cutting system towards the closed position. Turning off the electric motor 4 reduces the load on the battery. By momentarily reducing the load on the battery and then repowering the electric motor 4, a current spike is created, causing a temporary increase in cutting power of the pruner. This temporary increase in cutting power may be enough to overcome the blade stuck situation and cutting of the branch may thus be completed.

In an alternate embodiment of the pruner, the control system 5, as a response to detection of the blade stuck situation, is adapted in a recut operation to rotate the electric motor 4 in a second direction opposite the first direction, then to turn off the electric motor, and then to turn on the electric motor 4 and rotate the electric motor 4 in the first direction to actuate the cutting system towards the closed position. This further facilitates cutting of the branch, as the inertia advantages gained from the backwards rotation are combined with the enhanced current spike gained from turning off the electric motor 4.

It will be obvious to a person skilled in the art that the inventive concept can be implemented in various ways. The invention and its embodiments are not limited to the examples described above but may vary within the scope of the claims.

The invention claimed is:

1. A pruner comprising:
a pruner body comprising a first body section and a second body section attached to each other;
a cutting system connected to the first body section, the cutting system comprising a first cut element and a second cut element pivotably attached to each other for cutting branches, wherein the first cut element and the second cut element are configured to move relative to each other such that the cutting system has an open position and a closed position,
an electric motor connected to the second body section, and configured to provide driving power for the cutting system,
a control system configured to control the electric motor, and
a blade stuck detection system configured to detect a blade stuck situation in which the cutting system is not able to reach the closed position,
wherein the control system, as a response to detection of the blade stuck situation, is configured in a recut operation to rotate the electric motor in a second direction opposite the first direction, and then to rotate the electric motor in the first direction to actuate the cutting system towards the closed position; wherein the cutting system further comprises: at least one return spring configured to return the cutting system to the open position, and a transmission rope, wherein a first end of the transmission rope is connected to the cutting system, and a second end of the transmission rope is connected to the electric motor such that rotation of the electric motor in a first direction pulls the first end of the transmission rope towards the second body section.

2. The pruner according to claim 1, wherein the control system comprises a manual operating switch, and the control system is configured to repeat the recut operation until the user of the pruner releases grip from the operating switch or the cutting system reaches the cutting end position.

3. The pruner according to claim 1, wherein the control system comprises a manual operating switch, and the control system is configured to perform the recut operation if the user keeps holding the operating switch for a predetermined time.

4. The pruner according to claim 1, wherein the control system comprises a manual operating switch, and the control system is configured to control the electric motor to rotate in the second direction as a response to a situation in which a user of the pruner releases grip from the operating switch.

5. The pruner according to claim 1, wherein the control system is configured in the recut operation to rotate the electric motor in the second direction for at least 0.05 seconds as a response to detection of the blade stuck response.

6. The pruner according to claim 1, wherein the control system is configured in the recut operation to rotate the electric motor in the first direction at a rotation speed of more than 20% of a nominal rotation speed at the moment the cutting system hits the branch again in the recut operation.

7. The pruner according to claim 1, wherein the pruner comprises a revolution counter for the electric motor, and the blade stuck detection system is configured to detect the blade stuck situation based on the electric motor getting stuck before reaching a predetermined number of revolutions.

8. The pruner according to claim 1, wherein the blade stuck detection system is configured to detect the blade stuck situation based on the electric motor reaching a predetermined max current limit.

9. The pruner according to claim 1, wherein the pruner comprises a slack rope detection system, and the blade stuck detection system is configured to detect a blade stuck situation based on the slack rope detection system.

10. The pruner according to claim 1, wherein the pruner comprises a position detection system configured to detect the position of the first cut element and/or the second cut element, and the blade stuck detection system is configured to detect a blade stuck situation based on the position detection system.

11. The pruner according to claim 1, wherein the pruner comprises such a transmission ratio between the electric motor and the cutting system that the at least one return spring is not capable of rotating the electric motor in the second direction.

12. The pruner according to claim 1, wherein the pruner is a tree pruner, and the first body section and the second body section are spaced apart in a longitudinal direction of the pruner body.

13. The pruner according to claim 1, wherein the control system is configured to repeat the recut operation until the cutting system completely reaches the closed position.

14. The pruner according to claim 13, wherein the control system is configured to case repetition of the recut operation responsive to release of an operation switch.

* * * * *